June 4, 1957 I. G. MEIKLEJOHN 2,794,464
DEBARKING MACHINE HAVING INTERCONNECTED LOG-FEEDING
ROLLERS AND BARK-REMOVING CUTTERHEADS
Filed June 28, 1955 9 Sheets-Sheet 1

FIG. I.

*Inventor:*
IAN G. MEIKLEJOHN
By: Francis E. Boyce
*Attorney*

June 4, 1957     I. G. MEIKLEJOHN     2,794,464
DEBARKING MACHINE HAVING INTERCONNECTED LOG-FEEDING
ROLLERS AND BARK-REMOVING CUTTERHEADS
Filed June 28, 1955     9 Sheets-Sheet 3

*Inventor:*
IAN G. MEIKLEJOHN
By: Francis E. Boyce
*Attorney*

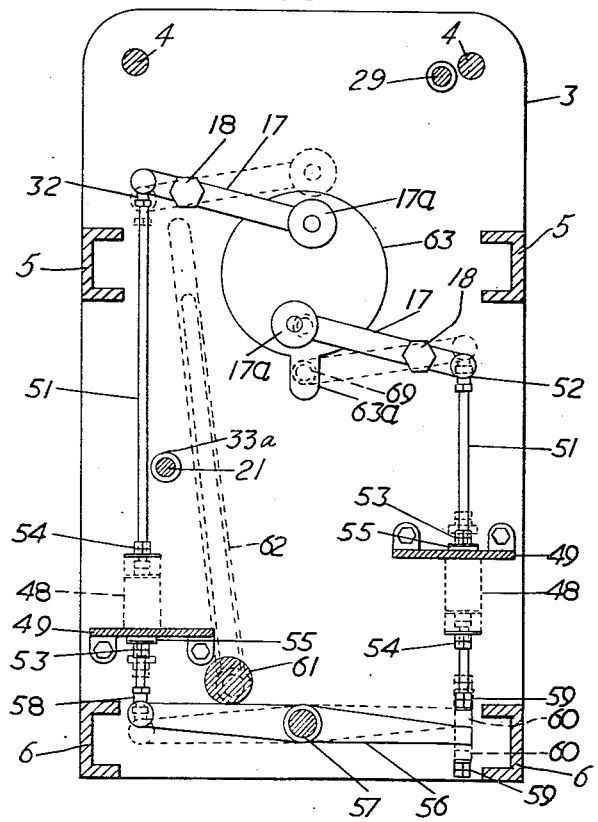

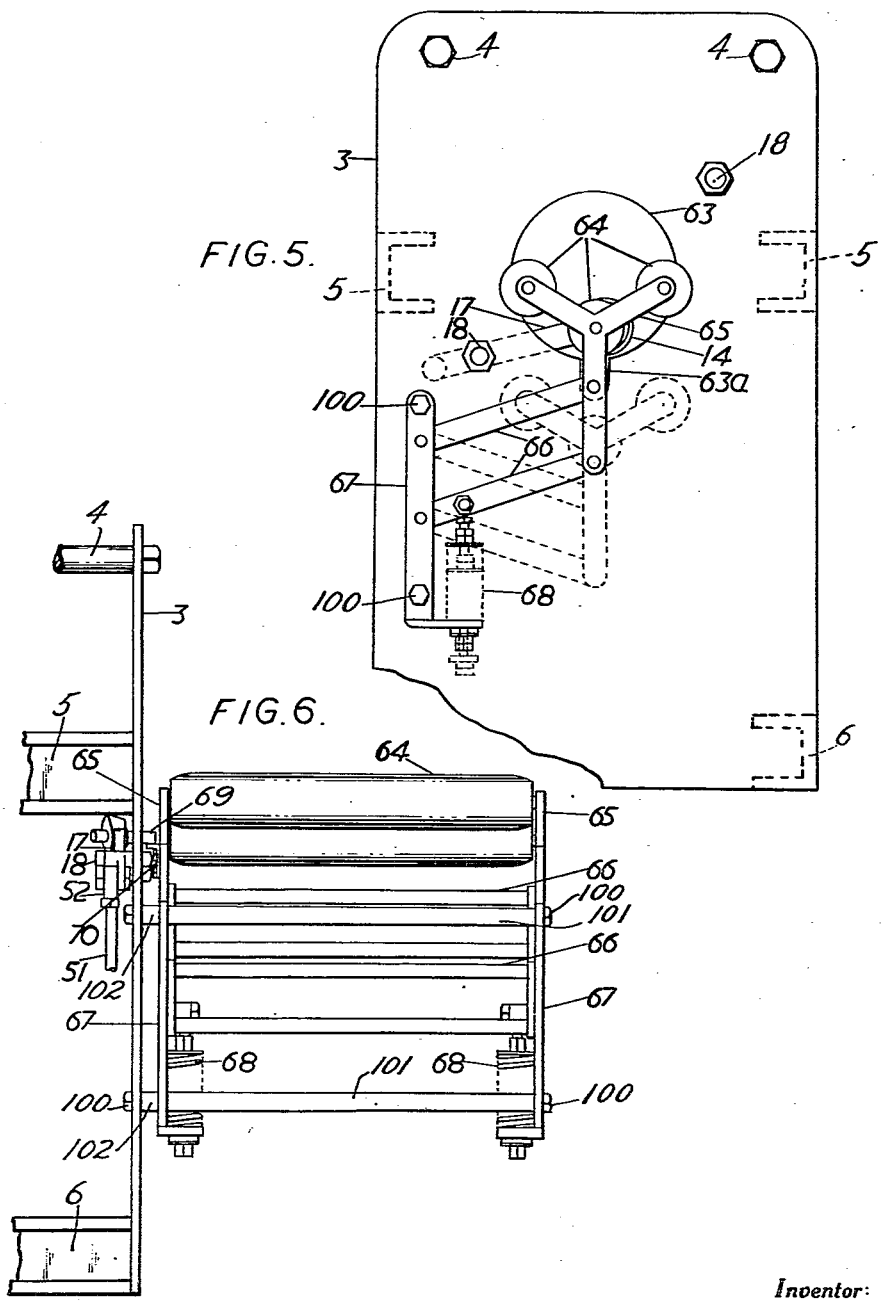

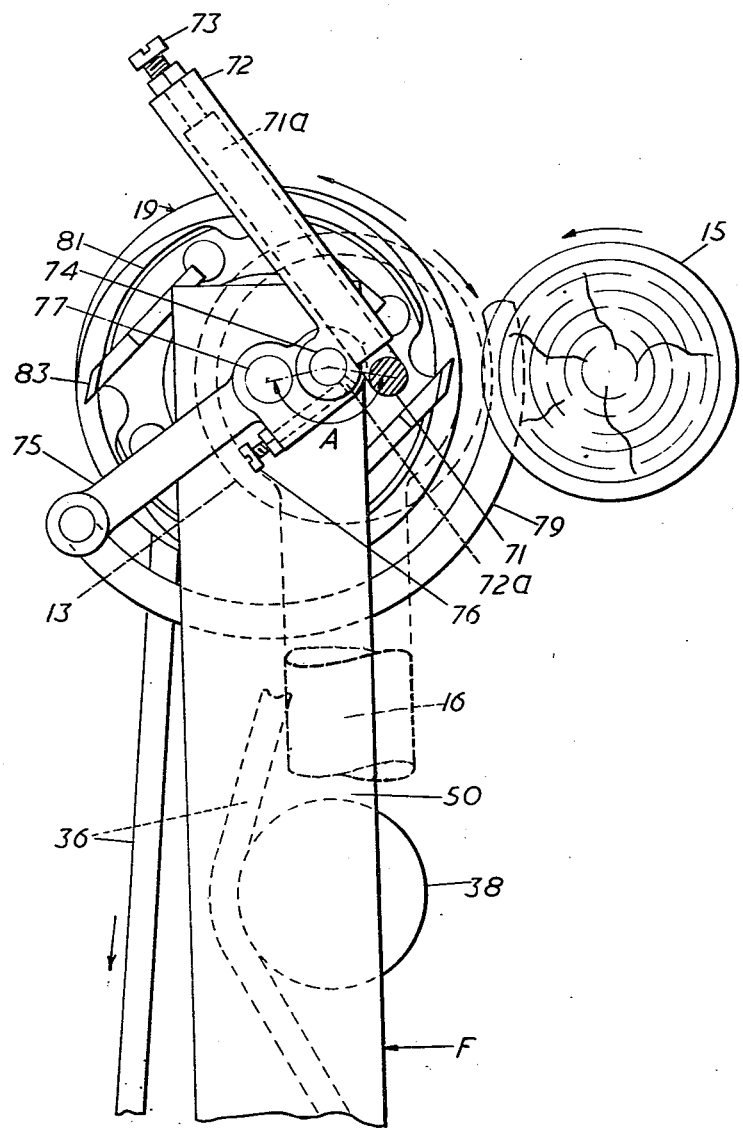

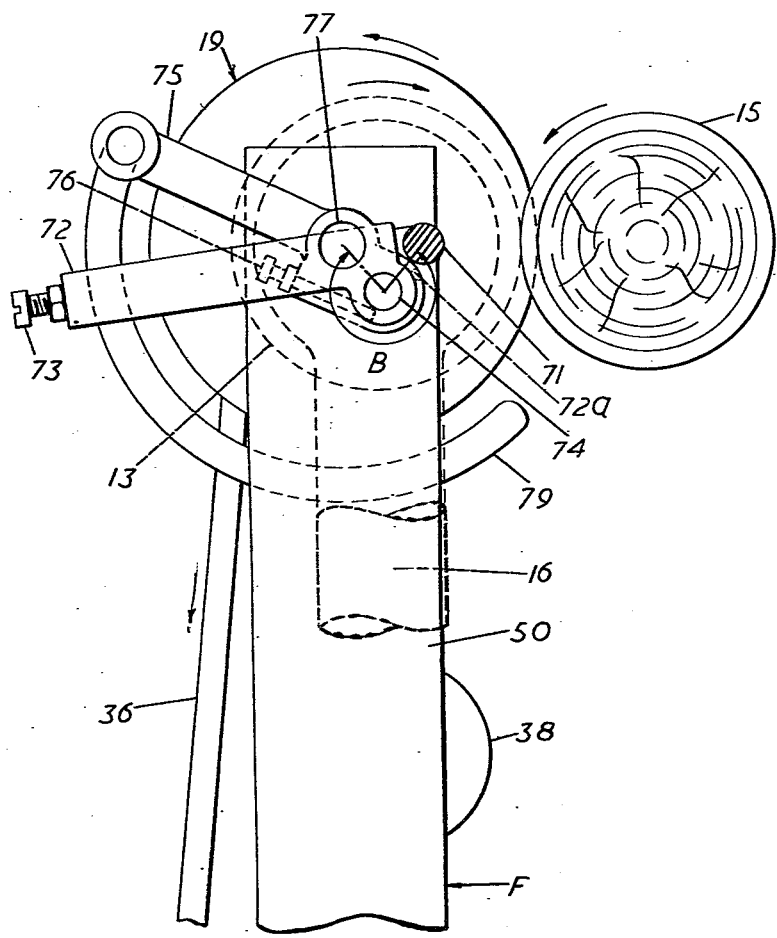

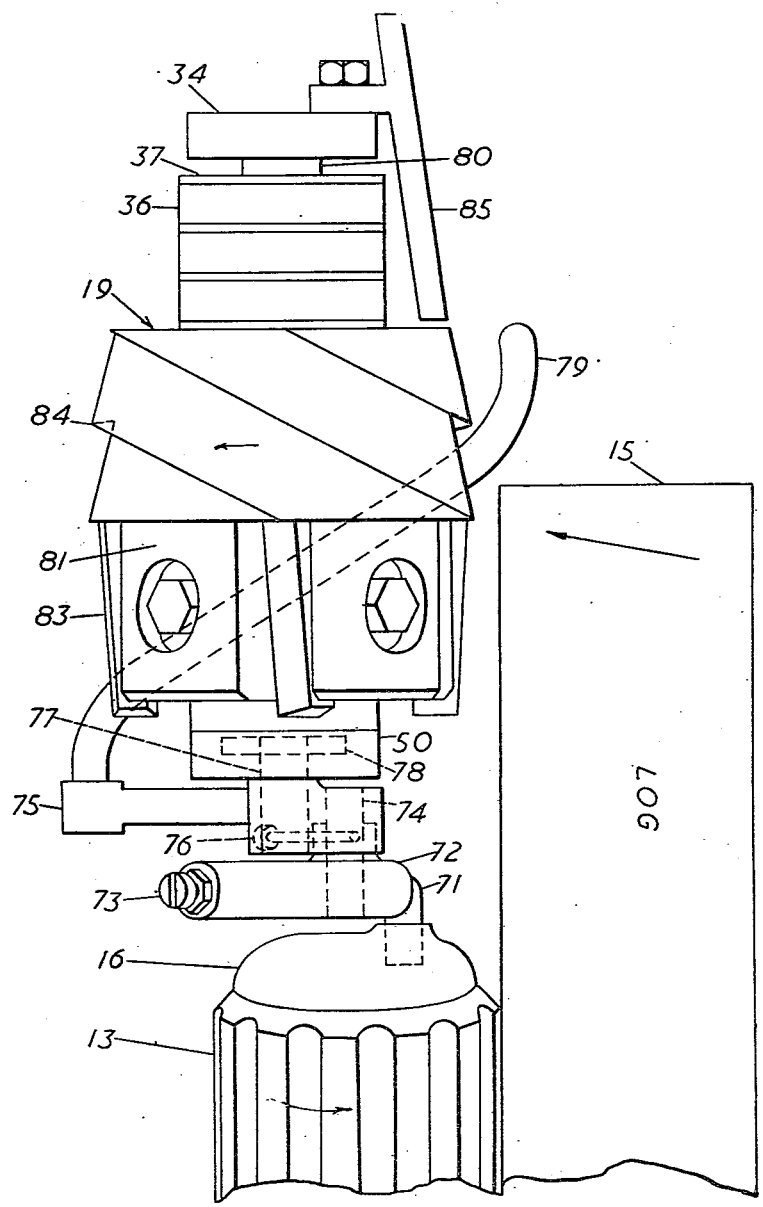

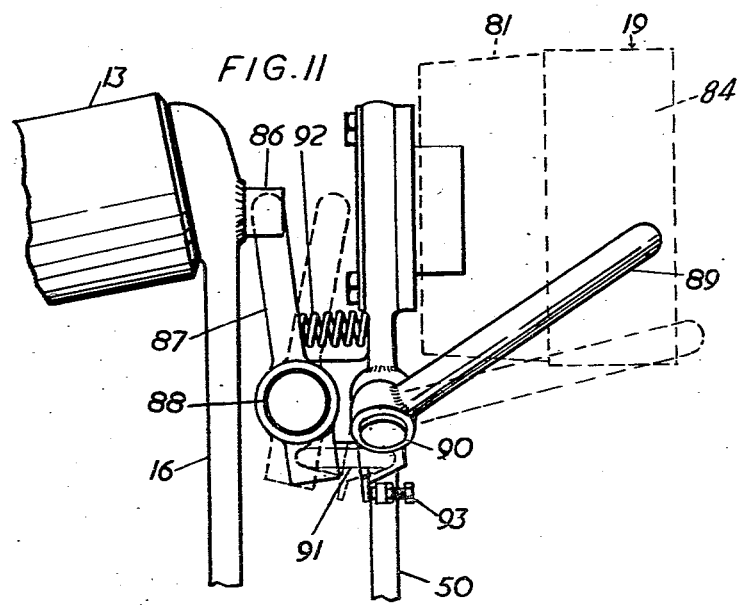

United States Patent Office 2,794,464
Patented June 4, 1957

2,794,464

DEBARKING MACHINE HAVING INTERCONNECTED LOG-FEEDING ROLLERS AND BARK-REMOVING CUTTERHEADS

Ian Goodhall Meiklejohn, East Wemyss, Scotland

Application June 28, 1955, Serial No. 518,639

8 Claims. (Cl. 144—208)

This invention relates to an improved power-driven machine for trimming and removing the bark from timber logs, with the minimum of damage to the surface of the wood, while at the same time trimming off knots or other protuberances.

The present invention provides a machine which will remove bark and bast, and trim projecting knots close to the surface of the wood, leaving the general surface of the log or tree virtually undamaged. The machine will debark complete tree trunks at high speed between predetermined minimum and maximum diameters, but where the timber is for use as pit props it is usually advantageous to cross-cut the tree into requisite lengths before debarking. The machine will handle varying lengths and varying diameters in rapid succession without adjustment.

The machine can be mounted on a floor, bench, or trailer and any form of motive power may be used. When mounted on a trailer, which of course can be transported to sites where timber is being felled, the most suitable form of power is a motor permanently mounted on the trailer, but the power take-off of a tractor may be used.

The machine of the present invention broadly comprises power-driven means for imparting a combined rotary and axially translational movement to the log so as to deliver it endwise to, and hold the log in contact with, one or more cutterheads that include rotary bark-removing tools arranged to operate on the log, with or without the provision of one or more rotary knot-trimming tools. The cutterhead or cutterheads are arranged to move away from the log before the forward end of the log reaches said cutterhead or cutterheads and then to move into contact with the log in order to operate on the surface thereof.

The means for imparting a combined rotary and translational motion to the logs is resiliently adjustable to different diameters of logs within predetermined limits and may comprise two or more longitudinally or helically ribbed, fluted or serrated elongated skew rollers to and between which the logs are successively fed, said skew rollers converging towards their delivery ends where they are resiliently spaced to permit passage of the logs between them. The skew rollers are rotated about their axes in the same direction and the inclination of the skew rollers is such that the desired axial translation is imparted to the log while the log is rotated by resilient contact of the skew rollers with the log. The skew rollers may be pressed into resilient contact with the logs by any convenient means and may be rotated by any convenient mechanism.

The skew rollers are adapted to deliver the log to the cutterheads which operate on the surface of the log and two or more of the skew rollers may be of extended length to support the log during the operation.

The delivery ends of the skew rollers may be supported by pivoted arms which are loaded by springs or counterweights to hold the rollers in contact with the logs while permitting the rollers to grip varying diameters of logs.

Guide rods may be provided between the skew rollers to prevent the logs from being inadvertently forced between the resiliently mounted skew rollers.

It is preferred to provide four skew rollers and to make one diametrically opposed pair longer than the other pair so that the cutterheads are located in the space beyond the delivery ends of the shorter pair of rollers and between the projecting ends of the longer pair of rollers, whereby the latter will maintain the rotary and translational motion of the log during the operation of the cutterheads.

The bark-removing tool may comprise a plurality of blunt scraping or abrading elements carried by a rotatable cutterhead and may be of helical form to operate either in an inclined or helical manner on the surface of the log. The bark-removing tool should be of such a nature and so mounted as to avoid cutting into the wood below the bark.

The element or elements of the bark-removing tool and the cutters of the knot-trimming tool are so radially positioned relatively to one another and to the axis of the log that the elements of the bark-removing tool prevent the cutters of the knot-trimming tool from penetrating into the surface of the wood beneath the bark. For this purpose the knot-trimming tool and the bark-removing tool, which together constitute a cutterhead, are preferably mounted on a cutterhead carrier or support resiliently urged radially inwards towards the log and movement of this carrier or support is controlled by mechanism operatively connected to the delivery ends of the short skew rollers in such manner that, as the delievery ends of the skew rollers open out on receiving a log, the cutterhead carrier or support is moved outwards and held in an inoperative position to prevent the end of the log from being forced against the leading ends of the cutterheads. When the end of the log reaches a position adjacent the bark-removing tool, the cutterhead carrier or support is released by contact of the end of the log with means for releasing the cutterhead carrier or support to permit the latter to move radially inwards and resiliently hold its cutterhead in operative position.

In order that the invention may be more clearly understood, I will now describe one embodiment of the invention by reference to the accompanying drawings, whereon:

Fig. 4 is a transverse vertical sectional view of the machine as seen on the line 4—4 in Fig. 1, and shows the spring linkage in more detail.

Fig. 5 is an elevation of the discharge end of the machine and shows the outfeed cradle.

Fig. 6 is a left-hand elevation of the outfeed cradle shown in Fig. 5.

Fig. 7 (see Sheet No. 2) is a more detailed elevation on an enlarged scale of the lever linkage between the short roller and the cutterhead. The roller and part of the rotor are shown in section for clearness, and support crank and lever arms are fragmented.

Fig. 8 (see Sheet No. 6) is a transverse vertical sectional view on the line 8—8 of Fig. 7 and shows the linkage on a further enlarged scale, the roller 13 and crank arm 16 being indicated in broken lines for greater clarity.

Fig. 9 is a view similar to Fig. 8, but shows the linkage in the position it assumes after movement from the angle indicated at A in Fig. 8 to the angle indicated at B in Fig. 9.

Fig. 10 is a plan view of the linkage and adjacent parts shown in Figs. 7, 8 and 9.

Fig. 11 is a detailed elevation corresponding to Fig. 7, but showing on a further enlarged scale an alternative form of lever linkage for the release of the cutterhead at a predetermined point. The roller 13, crank arm 16 and forward arm 50 of the tool-carrying frame are shown fragmented.

Figure 3:
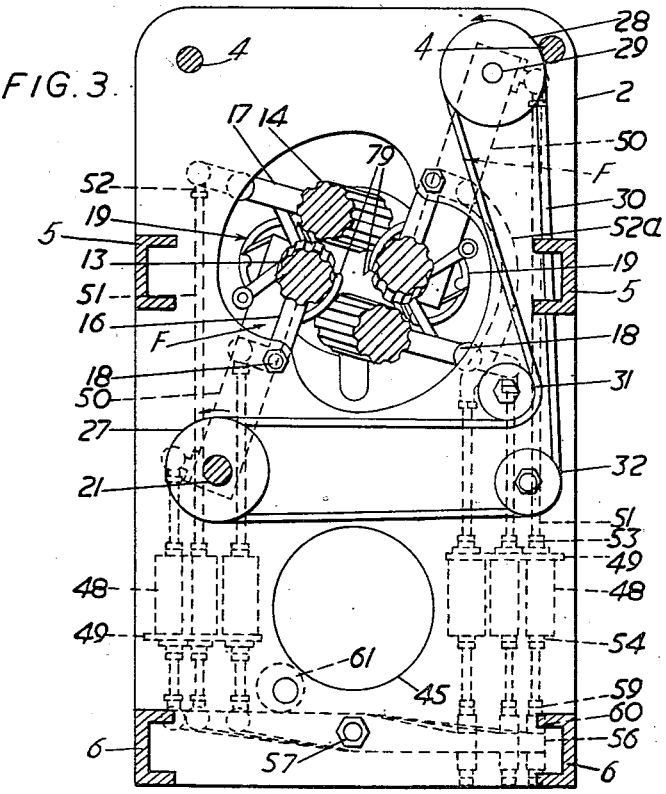
Fig. 3 is a transverse vertical sectional view of the machine as seen on the line 3—3 in Fig. 1, and shows a drive arrangement to the cutterheads, spring mechanism for returning the rollers and cutterheads to their initial positions being shown in broken lines.
Figure 12:
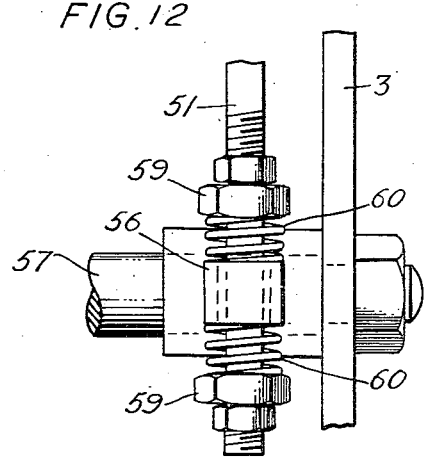

Fig. 12 (see Sheet No. 3) is a fragmentary enlarged right-hand side elevation of parts shown schematically in Figs. 3 and 4.

Figure 1:
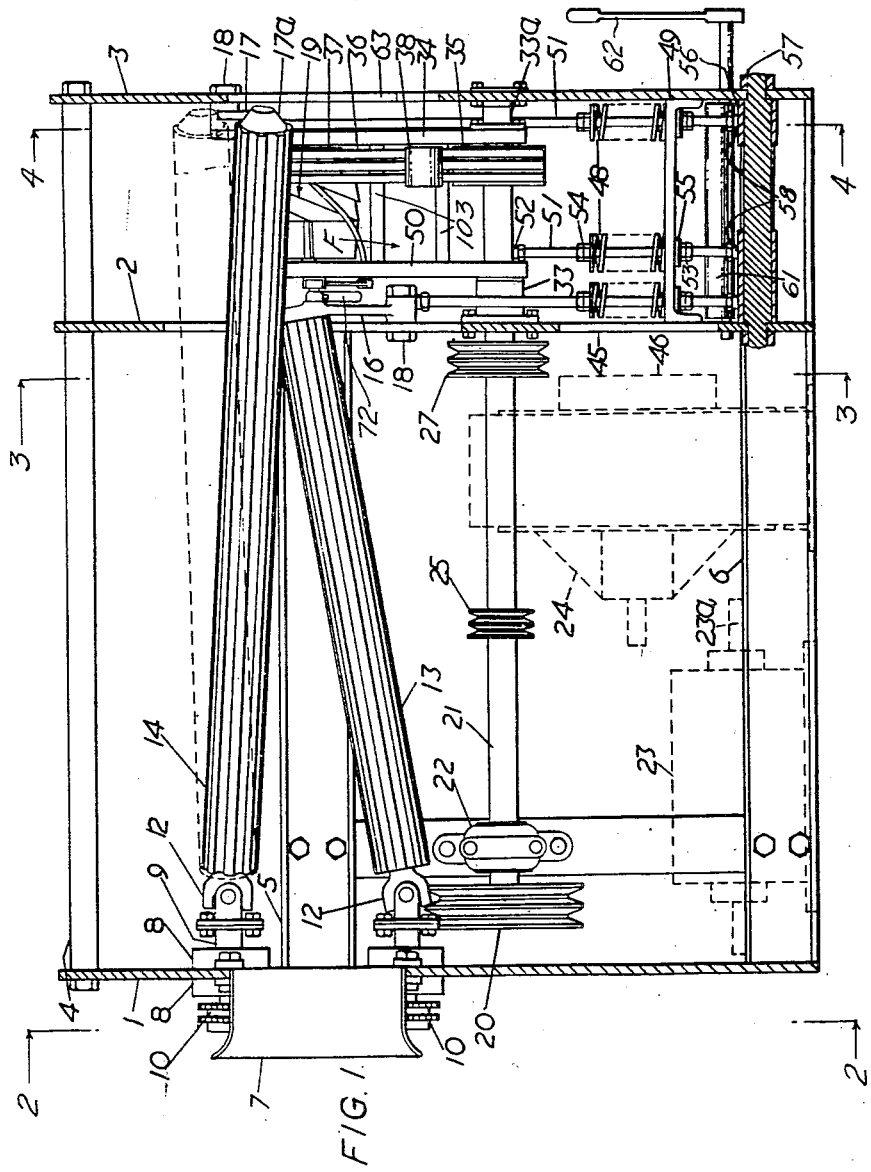
Fig. 1 is a longitudinal vertical sectional view of the machine as seen on line 1—1 of Fig. 2 but with chain and belt covers, some driving belts and an outfeed cradle omitted for the sake of clarity.
Figure 2:
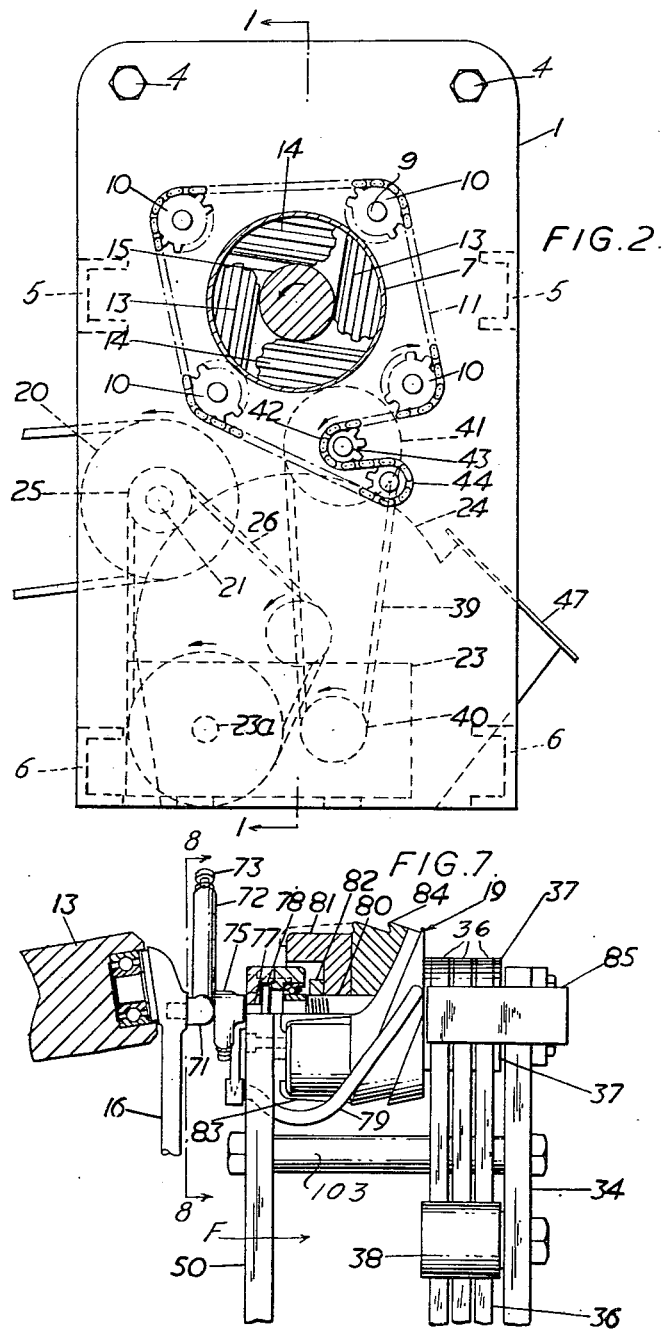
Fig. 2 is a semi-diagrammatic view of the feed end of the machine on the line 2—2 in Fig. 1, and shows a drive arrangement to the rollers.

The machine shown consists of three vertical plates 1, 2 and 3, rigidly connected by tie rods 4 and channels 5 and 6, as shown in Fig. 1. Plate 1 has a large aperture, rigidly attached to which is a funnel 7, which provides an unobstructed entry for the timber logs. Mounted on plate 1 are ball-journal housings 8. These carry roller driving shafts 9 which are driven through sprockets 10 and a chain 11 (Fig. 2). The shafts 9 are flanged and bolted to universal joints 12. These in turn are rigidly connected to rollers which are serrated or fluted as shown to obtain a good grip on the log. It is advantageous to employ four rollers, two short rollers 13 which grip the log 15 more or less laterally, and two long rollers 14 which grip the log more or less vertically as shown in Fig. 2. The short rollers 13 are at one end mounted on crank arms 16, and the long rollers 14 on first-class lever arms 17, and these in turn are pivoted on pins 18. The shafts 9 and the pins 18 are coaxial for each individual roller. The short rollers 13 are in advance of and approximately co-axial with a debarking rotary cutterhead 19, whereas the long rollers 14 project beyond the short rollers 13 and between the cutterheads 19 to provide continuous feed for the log until it is expelled from the machine. The lever arms 17 have roller-supporting ends 17a which are rounded or tapered to provide unobstructed exit for the log.

The main drive to the machine is to a pulley 20, on a main countershaft 21. This shaft is mounted on a plummer block 22 and drives a constant-speed shaft 23a of a variable-speed gear in a gear box 23 (shown in dotted outline) and paddle-type fan 24 (also shown in dotted outline for clarity) through a pulley 25 and belt 26. The shaft 21 also bears a pulley 27 which drives a pulley 28 on a debarker countershaft 29 (Fig. 3) by means of a belt 30. This belt passes over jockey pulleys 31 and 32 (one of which is adjustable for correct belt tensioning). These jockey pulleys are provided to ensure that the belt does not obstruct the rollers. The shaft 21 passes freely through the center of a trunnion 33 and is mounted in a ball-journal (not shown) whose housing is formed in a trunnion 33a of a rear arm 34 of a debarker-supporting frame F. There are two debarker-supporting frames F, each consisting of a rear arm 34 and a forward arm 50 connected together in parallel vertical relationship by belts 103. The connected arms 34 and 50 of one frame are pivotally mounted upon and extend upwards from the axis of the shaft 21, and the connected arms 34 and 50 of the other frame are pivotally hung from the shaft 29 (see Fig. 3). Each frame carries at its outer end the rotary cutterhead 19. The shaft 21 also carries a pulley 35 which drives the cutterhead by means of belts 36 and a pulley 37. These belts are tensioned by an adjustable jockey pulley 38. (Figs. 1, 7, 8 and 9.) The cutterhead 19 of the other frame F is driven in a similar manner from the countershaft 29.

Returning to Fig. 2 it is evident that the constant-speed shaft 23a of the gear box 23 will be driven at reduced speed as compared to the speed of shaft 21. The speed is further reduced by a belt drive 39 from an output pulley 40 to a pulley 41. This pulley in turn drives a sprocket 42 through a shaft 43 and by means of the chain 11 the rollers 13 and 14 are driven. The chain is tensioned by an adjustable jockey sprocket 44 and the shaft 43 is also adjustably mounted for tensioning the belt 39. Although in most cases V-belt drives are most convenient it is also evident that alternative forms of drive are practicable. The speed of the output shaft of the gearbox is variable between limits and consequently there is a corresponding range of feed speed for the logs. Lower feed speeds are desirable for bent logs or logs with large knots to prevent overloading the cutterheads 19. The rate of feed is adjusted by simple hand control (not shown) and can be varied while the machine is in operation. Other types of gearbox could also be used.

The paddle type fan 24 is provided to draw off by suction the bark and wood chips which are thrown off upwards and downwards by the cutterheads 19. For clarity the ducts to the fan inlet are not shown but two ducts are provided, the inlets of which are suitably situated above and below their corresponding cutterheads 19. These ducts join and pass through an aperture 45 in the plate 2 to connect with a fan inlet 46. Chips are expelled from a fan outlet 47 at high velocity and may be disposed of in any suitable manner or they may be conveyed to a settler.

The distal ends of the short and long rollers and the cutterheads are urged inwards to bear on the log being debarked by the action of compression springs 48. These springs are mounted on fixed plates 49 and are connected to the crank and lever arms 16 and 17 and to the forward arms 50 of the debarker-supporting frames F by means of connecting rods 51 and yokes 52. A yoke 52a (see Fig. 3) connected to one of the short roller crank arms is specially shaped to prevent obstruction to the roller in its outermost position. The innermost position of the rollers and cutterheads is adjusted by means of nuts with locknuts 53, and the pressure on the surface of the log is adjusted by means of nuts and locknuts 54. In their innermost position, the rollers and cutterheads clear each other by short distances. After a log has left the machine, the rollers and cutterheads return to the innermost position with considerable force and consequently washers 55 of suitable resilient material are provided to absorb some of the shock. Where very rough timber with large knots is being debarked there may be a tendency for the log to be forced outwards between adjacent rollers. In order to maintain the log as centrally as possible, and consequently to provide as smooth an action as possible, the diametrically opposing rollers and cutterheads may be linked together in the following manner: Referring to Fig. 4 the connecting rods 51 are linked together by a lever 56 mounted on a fixed shaft 57. The lever 56 is pivotally connected at one end to one rod 51 by a yoke 58, while at the other end the second rod 51 passes freely through an aperture in the lever 56 and between the lever 56 and adjustable nuts with locknuts 59 on the rod are compression springs 60. It will be evident that if the springs 60 are compressed up almost solid by the nuts 59 then any upward movement of the upper long roller must result in a corresponding downward movement of the lower long roller as shown in dotted outline, and vice versa. If the springs 60 are released slightly then there will be a corresponding independent movement possible between one roller and the other. Some degree of independent movement is desirable to allow for variation in regularity of the log surface and this can be precisely adjusted. The cutterheads and short rollers may be linked together in a like manner (Fig. 3) although in the case of the short rollers the degree of independent movement needs to be considerably larger as at the point where the short rollers grip the log the knots have not yet been trimmed off.

An eccentric 61 operated by a hand-controlled lever arm 62 may be provided to act on the levers 56 as shown in Fig. 4. In operation this can be used to depress all the levers 56 simultaneous and so open outwards all the rollers and cutterheads. This would be of use if any log became inadvertently jammed or in the case of accidents.

As the debarked log emerges from the machine through an aperture 63 in plate 3 the projecting length of log produces a leverage on the long rollers tending to force them apart. This increases the further the log projects and Figs. 5 and 6 show one form of cradle which may be used to support the log until debarking is complete. This consists of a set of three rollers 64 freely rotatable in bearings mounted in Y-shaped end plates 65. These end plates are rigidly connected by tie rods (not shown) and are pivotally mounted on two parallel linkage frames 66 which in turn are pivotally mounted in fixed supports 67 secured to the rear of plate 3 by means of longitudinal bolts 100 on which are mounted elongated sleeves 101 between the supports 67 and short sleeves 102 between the forward support 67 and the rear face of plate 3. The rollers 64 are curved off at their end to allow unobstructed passage of the log and form a trough between them into which the log can pass and the whole cradle has a wide range of movement in a more or less vertical direction as shown by dotted outline. The cradle is spring-urged upwards by compression springs 68. These are mounted, connected to the lower linkage frame 66, and adjusted in a manner similar to the springs 48. The lower lever arm 17 of the long roller carries a fixed pin 69 which bears on an adjustable stop 70 attached to the plate 65, and causes the cradle to be depressed when the lower long roller is depressed. This ensures unobstructed exit of the log, while the cradle is free to be depressed further still if a very twisted log is being debarked. Freedom of movement for the pin 69 is allowed for by a notch 63a in the plate 3.

As described the diametrically opposed cutterheads expand outwards in conjunction with the short rollers 13 until the log reaches a point between bark-removing tools 84. This prevents wood being removed inadvertently by knot-trimming cutters 83. The arms 34 and 50 which carry the cutterheads are pivotally mounted on the trunnions 33 and 33a. In Figs. 7 to 10 a right-angled push rod 71a terminates in a pintle 71 pivotally mounted in the arm 16. The rod 71a is free to slide in a sleeve 72 but comes in contact with an adjustable stop 73 in its innermost position. This sleeve is pivotally mounted on a pintle 74 which is fixed in a double-armed lever 75, and the sleeve 72 carries a stop 72a which comes in contact with an adjustable screw 76 on the lever 75 in the closed position shown in Fig. 8. The lever 75 is fixedly attached to a pintle 77 which is rotatably mounted in the forward arm 50 and carries a spring 78 of watch-spring type at its distal end. This spring urges the inner arm of the lever 75 into the position shown in Fig. 8. The whole mechanism is totally enclosed to prevent entry of dirt which might obstruct its action. The outer arm of the lever 75 has fixedly attached to it a spiral-shaped rod 79. These rods 79 as shown in Figs. 3 and 7 to 10 pass partly around the cutterheads 19 and the tips of the rods 79 project into the space between the bark-removing tools 84 and the long rollers 14. When the machine is running free the lever linkage is in the closed position shown in Fig. 8, the centers of the three pintles 71, 74 and 77 forming an angle A which is less than 180°. When a log enters the machine the short rollers expand outwards at their distal ends and through the lever linkage carry the cutterheads outwards also. The cutterheads are adjusted to be at a slightly greater distance apart than the rollers by the adjustable stop 73. The log is thus free to pass between the cutterheads 19 but at this point it comes in contact with the spiral rods 79 and as the log is rotating in an anti-clockwise direction each of the levers 75 (Figs. 7 and 8) is turned in clockwise direction. When the angle between the pintles 71, 74 and 77 is greater than 180° the action of the debarker return spring 48 comes into play and urges the lever 75 further in a clockwise direction until the angle between the pintles becomes greater as indicated by the angle B in Fig. 9. The cutterheads are thus allowed to bear on the surface of the log until debarking is complete. When the log passes the ends of the short rollers they return to their closed position and are free to do so by virtue of the rod 71 sliding in the sleeve 72. When the log passes the end of the rod 79 the whole linkage returns to its closed position.

Referring to Fig. 7 a shaft 80 is mounted on ball journals as shown. On this shaft are assembled coaxially a cutter block 81, the debarking tool 84 and the pulley 37. These are keyed to the shaft and locked by a nut 82. The knot-trimming cutters 83 are removably attached to the cutter block 81. A cutting edge of each of these cutters 83 lies out of parallel to the axis of rotation of shaft 80, being nearer said axis at the leading or infeed side of the cutter, so that cutting profiles of opposed cutters provide a log-receiving gap which gradually decreases in width toward the rear or trailing sides of the cutting profiles, whereby the whole knot is gradually trimmed off. In large knots two or three rotations of the log may be necessary before the whole knot is trimmed substantially in line with the general surface of the log. The leading edges of the cutters 83 are also sharp so that a free cutting entry into knots is assured.

The debarking tool 84 in rear of the cutters 83 has helical teeth which bear directly on the wood. The edges of the teeth are rounded off so that the wood is not damaged, but the teeth are undercut as shown in section to ensure that bark and bast are cleanly lifted. Spiral surfaces which form trailing sides of the teeth incline rearwardly and toward the axis of shaft 80 so as to provide a clearance angle behind the teeth. As each cutterhead 19 rotates counter-clockwise it will be understood that the points of contact of the debarker teeth with the log are moving in very rapid succession towards the feed end of the machine and will thus lift the bark. The helix angle at which the teeth are set may vary. At angles approaching 90° debarking is very smooth but requires heavy pressure, whereas at angles approaching 0° debarking is rougher and requires less pressure but may cause damage to the wood surface.

The sharp cutters 83 for trimming knots are not essential and the machine will debark logs with the debarking tools 84 alone. However the provision of knot-trimming cutters 83 ensures a smoother action and cleaner log.

A modified means for causing opening movement of the short rollers 13 to spread the cutterheads 19 is shown in Fig. 11. A pin 86 is rigidly attached to the arm 16 so that when a log enters the machine and spreads the rollers 13, this pin bears on a lever 87 which is pivotally mounted by a pin 88 on the forward arm 50 of the frame F, and a similarly acting pin and lever (not shown) on the opposite arm 16 and frame F cause the cutterheads 19 to be moved away from each other. As the log enters between the debarking tools, it comes in contact with a lever 89 which is pivotally mounted by a pin 90 on the arm 50. The lever 89 is thus deflected towards the position shown by dotted outline and by means of a push rod 91 the lever 87 is disengaged from the pin 86 and moved into the position shown in broken lines, so that the debarking tools can move towards each other into operation on the log surface. After the log has passed through the machine, the lever linkage returns to the position shown in full lines in Fig. 11 under the action of a return spring 92. An adjustable stop 93 can be provided to adjust the initial position of the lever 89.

A belt guard 85 is rigidly attached to the rear arm 34 of the frame F. It prevents the belts rubbing on the log after it has passed the tools 84 and as it may be inclined towards the exit from the machine it assists in expelling the log.

I claim:

1. A machine for trimming and removing bark from timber logs comprising a rotary bark-removing tool positioned adjacent one end of resiliently and automatically adjustable power-driven rollers operative to impart a combined rotary and axially translational movement to a log when positioned between said rollers, so as to deliver it endwise to and hold such a log in contact with said tool, said power-driven rollers being adjustable, by divergent movement from one another, to different diameters of logs within predetermined limits, and means operative by said divergent movement to move said tools out of the path of such a log as a leading edge thereof approaches said tools, and to move said tools into contact with such a log so as to operate on a peripheral surface thereof as such log is advanced by said rollers.

2. A machine for trimming and removing bark from timber logs comprising a plurality of elongated rollers to and between which a log can be successively fed in an axial direction, means resiliently urging said rollers into convergence towards their delivery ends to permit said rollers to adjust automatically and grip a log, a rotary bark-removing tool adjacent the delivery end of said rollers, and means operative by divergent movement of the delivery ends of said rollers to move said tool out of the path of such a log as a leading end thereof approaches said tool, and to move said tool into contact with such a log to operate on a peripheral surface thereof as such a log is advanced by said rollers.

3. A machine as specified in claim 2 wherein the elongated rollers comprise a pair of lateral diametrically opposed shorter rollers and a pair of diametrically opposed longer rollers projecting at their distal ends beyond the distal ends of the shorter rollers, the bark-removing tools being located between the distal ends of the shorter rollers and the distal ends of the longer rollers, and wherein said last-named means includes mechanism linking the distal ends of said rollers together and controlling movement thereof towards and away from each other.

4. A machine for trimming and removing bark from timber logs comprising a plurality of serrated rollers arranged around and inclined to a central longitudinal axis to receive a log between them, a universal bearing support for a forward end of each of said rollers, resilient means urging a distal end of each of said rollers towards said axis into contact with a log thereby gripping such a log, power means for rotating said rollers in the same direction about their axes so as to impart rotary and axial translation to such a log, a plurality of rotary bark-removing tools adjacent the distal ends of said rollers, and means operative by movement of the distal ends of said rollers away from said central longitudinal axis to move said tools clear of such a log as a leading end thereof approaches said tool, and to move the latter into contact with such a log to operate on a peripheral surface thereof as such a log is advanced by said rollers.

5. A machine as specified in claim 4 wherein some of the rollers are longer than other of the rollers so that the distal ends of the longer rollers are disposed rearwardly beyond the distal ends of the shorter rollers and wherein the debarking tools are located between the distal ends of the shorter and longer rollers.

6. A machine according to claim 4 wherein some of the rollers are longer than other of the rollers so that the distal ends of the longer rollers are disposed rearwardly beyond the distal ends of the shorter rollers and wherein the debarking tools are located between the distal ends of the shorter and longer rollers, and wherein said last-named means includes mechanism linking the distal ends of said rollers together and controlling movement thereof towards and away from the central longitudinal axis in order to centralize such a log in its axial translatory movement.

7. A machine according to claim 4 including a pivoted tool carrier for each of said rotary bark-removing tools, and knot-trimming cutters disposed in front of each said tool and rotatably mounted therewith on said carrier, said last-named means being operative to rock said pivoted tool carriers about their pivotal axes.

8. A machine for trimming and removing bark from timber logs comprising serrated rollers arranged in pairs of shorter and longer rollers around and inclined to a central longitudinal axis to receive a log between them, a universal bearing support for a forward end of each of said rollers, the pair of longer rollers projecting at their distal ends beyond distal ends of the pair of shorter rollers, means resiliently urging said rollers into convergence at their distal ends to permit said rollers automatically to adjust their grip on a log fed between said rollers, two diametrically opposite sets of rotary knot-trimming and debarking tools disposed at opposite sides of said longitudinal axis between the distal ends of the shorter and longer rollers, a carrier for each set of tools, each carrier being movable away from said longitudinal axis to move said tools clear of such a log as a leading end thereof approaches said tools, resilient means arranged to move said tools inwards to operate on such a log as it is advanced into position between the two sets of tools, mechanism linking the distal ends of said rollers together and controlling movement thereof towards and away from each other, linkage mechanism connecting each tool carrier to the distal end of one of the shorter rollers so as to move the two sets of tools apart as the shorter rollers move apart, releasing means releasing said linkage mechanism to permit the two sets of tools to move inwards under the influence of said resilient means, and power means for rotating said rollers in one direction, and for rotating said tools in an opposite direction.

References Cited in the file of this patent

UNITED STATES PATENTS

| | | |
|---|---|---|
| 2,025,337 | Camden et al. | Dec. 24, 1935 |
| 2,588,903 | Akins | Mar. 11, 1952 |
| 2,669,266 | Bouchard | Feb. 16, 1954 |

FOREIGN PATENTS

| | | |
|---|---|---|
| 117,415 | Switzerland | Oct. 15, 1946 |